United States Patent
Baudat

[19]

[11] Patent Number: 5,992,600
[45] Date of Patent: Nov. 30, 1999

[54] MONEY VALIDATOR

[75] Inventor: Gaston Baudat, Geneva, Switzerland

[73] Assignee: Mars, Incorporated, McLean, Va.

[21] Appl. No.: 08/647,999

[22] PCT Filed: Nov. 30, 1994

[86] PCT No.: PCT/IB94/00375

§ 371 Date: Jun. 19, 1996

§ 102(e) Date: Jun. 19, 1996

[87] PCT Pub. No.: WO95/15540

PCT Pub. Date: Jun. 8, 1995

[30] Foreign Application Priority Data

Nov. 30, 1993 [GB] United Kingdom .................... 9324539

[51] Int. Cl.$^6$ .................................................. G07D 7/00
[52] U.S. Cl. .......................................... 194/207; 194/317
[58] Field of Search ................................... 194/206, 207, 194/317, 318, 319; 382/135

[56] References Cited

U.S. PATENT DOCUMENTS

| | | | |
|---|---|---|---|
| 4,556,140 | 12/1985 | Okada ................................... | 194/334 X |
| 4,578,770 | 3/1986 | Mitani . | |
| 5,052,043 | 9/1991 | Gaborski .................................... | 382/14 |
| 5,060,278 | 10/1991 | Fukumizu ................................. | 382/14 |
| 5,067,604 | 11/1991 | Metcalf .................................... | 194/203 |
| 5,201,395 | 4/1993 | Takizawa et al. ....................... | 194/206 |
| 5,247,584 | 9/1993 | Krogmann ................................ | 382/14 |

FOREIGN PATENT DOCUMENTS

| | | |
|---|---|---|
| 0 155 126 | 9/1985 | European Pat. Off. . |
| 0 164 110 A2 | 12/1985 | European Pat. Off. . |
| 0 480 736 A2 | 4/1992 | European Pat. Off. . |
| 480736 | 4/1992 | European Pat. Off. ................ 194/317 |
| 0 553 402 | 8/1993 | European Pat. Off. . |
| 0 560 023 | 9/1993 | European Pat. Off. . |
| 2-108185 | 4/1990 | Japan ..................................... 194/207 |
| 4-118796 | 4/1992 | Japan ..................................... 194/206 |
| 2 059 129 | 4/1981 | United Kingdom . |
| 2 247 312 | 2/1992 | United Kingdom . |
| 2250848 | 6/1992 | United Kingdom ................... 194/317 |
| WO 94/12951 | 6/1994 | WIPO . |

OTHER PUBLICATIONS

International Search Report in International Application No. PCT/IB94/00375.

Examiner's Report to the Comptroller under Section 17 (The Search Report) in GB application No. 9324539.7.

"High Speed Conveyed Bill Money Recognition with Neural Network", Fumiaki Takeda, Sigeru Omatu, Takashi Inoue, and Salzo Onami; Robotics Mechatronics and Manufacturing Systems, Elsevier Science Publishers B.V. (North–Holland); 1993 IMACS.

"Bill Money Recognition by a Small Size Neural Network", Fumiaki Takeda, Sigeru Omatu, and Takashi Inoue; Bulletin of Faculty of Engineering, The University of Tokushima, No. 38, 1993.

*Primary Examiner*—F. J. Bartuska
*Attorney, Agent, or Firm*—Fish & Richardson P.C.

[57] ABSTRACT

A method of classifying a test article as one of a plurality of acceptable denominations of articles of currency, comprising applying a statistical classification process which employs discriminant surfaces derived from previous test articles known to be valid or invalid and is arranged to distinguish therebetween, characterized by applying also an acceptance boundary test which limits the acceptance volume for each denomination so as to exclude forgeries for which the discriminant surfaces were not derived.

28 Claims, 11 Drawing Sheets

MONEY VALIDATOR

BACKGROUND OF THE INVENTION

This invention relates to a money validator for validating articles of value; particularly but not exclusively, to a money validator for validating bank notes.

Money validators are known which comprise sensors (e.g. a plurality of optical heads) for generating sensed signals in response to an article to be validated, and decision means (e.g. a microprocessor, microcomputer or LSI circuit) for decided, on the basis of the sensed signals, whether the article corresponds to a valid denomination or not. Generally, the validation process may consist of comparing the sensed signals (or values derived therefrom), with predetermined thresholds which define acceptable ranges or "windows" of values, within which signals from a valid article are assumed to lie and outside which signals from invalid articles are likely to lie.

It is known to vary the thresholds, and/or the ranges or windows, over time to take account of drift, either in the response of the sensors, or in the properties of a population of articles to be validated; see, for example, European patent 155126 and International application WO80/01963 (British Patent 2059129), or European published Application EP-A-0560023 and corresponding U.S. application Ser. No. 08/013,708.

This technology is found to be effective where there is a clear limit boundary between a genuine sample population and a false sample population. However, this is not always the case. Separating the genuine from the false population, in the measurement space defined by the sensor output signal axes, may require a complex, non-linear boundary.

A pattern recognition technique known in the general field of pattern recognition is the so called "neural network" technique. In neural network techniques, sensor output signals are supplied to a plurality of similar parallel processing units, the outputs of which comprise some function of their inputs. In practice, the "units" are usually not provided by separate hardware, but by a single processor executing sequential processing.

Neural networks generally operate in two phases. In a training phase, the functions applied by each unit are derived by an interative training process comprising presenting known genuine and false samples to the network. In the case of a "supervised" type of network, such as the back propagation or perceptron type, the outputs of the units are monitored, compared with a "correct" network output, and the difference or error between the actual network output and the correct output is propagated back to incrementally affect the functions applied by each unit to its inputs. Where two or more network layers are provided, the function is a non-linear (e.g. sigmoidal) function of the weighted sum of the inputs, which enables the network to discriminate between disjoint patterns, and allows complex non-linear pattern separation discriminants.

After the training phase is complete (and, typically, the training phase may require many hundreds of thousands of iterative adjustments to the network) the network is found to have adapted to the statistics of the population of true and false articles to be validated which was presented during the training phase, and can generally perform a non-linear (in measurement space) separation between true and false articles which are subsequently presented to the network.

Hitherto, however, neural networks have not been applied to banknote recognition. Indeed, there would be resistance to the use of neural network techniques in money validation, because it is difficult to accurately characterise the level of performance of the network since, due to the non-linear nature of the signal processing applied by the network, it is not always clear how effectively, or in what manner, the network is discriminating between true and false articles.

SUMMARY OF THE INVENTION

In one aspect, the present invention provides a money validator comprising a classifier which classifies articles as one of a number of predetermined types of articles of value utilising classification data comprising predetermined coefficients derived from a known training set of articles of value to output, at each classification, a plurality of results each corresponding to said types, characterised in that, in classifying the measurements of the test article, the classification is performed a plurality of times, once for each class of article of value to be recognised, and in each case the classification is performed to take account of changes in the statistics of the population of one particular class of articles of value, the statistical classification being utilised to confirm or otherwise that the test article corresponds to that class. Needless to say, the plural classifications can be carried out in sequence or in parallel.

It might seem surprising that where a plurality of classification results are calculated for different classes by the classifier, this process of calculating classification results for a plurality of different classes should be performed whilst adjusting the classification process for one particular class. Nonetheless, from the following, it will be understood that this leads to a significant improvement in the accuracy of the classification.

In the above aspect, the classifier may comprise a neural network; that is to say, it may comprise a classifier performing a number of parallel calculations (i.e. calculations on the same input data, whether carried out at the same time, or in sequence) utilising predetermined data derived by iterative modification from test articles of value. In this case, the normal method of allowing the validator to adapt to changing population statistics would be to continue to train the neural network in use. However, we have found that this can undesirably lead towards the network either training on forgeries, so as to lower its acceptance rate, or alternatively if steps are taken to avoid this by training the network only on selected valid articles of value, the network becomes unrepresentative and will reject acceptable articles of value. Accordingly, we have found it is preferable to provide a separate adjustment for the change in the statistics (e.g. average and/or deviation therefrom) of populations of each class of articles of value to be recognised, so as to align their statistics with those for which the classifier was derived.

In another aspect, the present invention provides a banknote recognition apparatus comprising a neural network (as above defined) derived using the back propagation method, such as a multilayer perceptron network. This type of network is found to give a surprisingly robust performance, and to provide a remarkably effective transformation of the input data; for example where (as in the below embodiment) the input data comprises a very large number (e.g. 270) of optical measurements of the test article, it has been found possible to achieve recognition using only 12 hidden layer nodes within the neural network. Thus, the network has effectively transformed a 270 dimensional input measurement space into a 12 dimensional measurement space in which the different classes (e.g. 72 different denominations/orientations) are effectively partitioned.

In another aspect, the present invention consists in providing a neural network classifier for a banknote validator comprising a plurality of different neural networks, one for the banknote set of each of a plurality of different countries, or one for a group of countries (e.g. Western Europe).

BRIEF DESCRIPTION OF THE DRAWINGS

The invention will now be illustrated, by way of example only, with reference to the accompanying drawings, in which:

FIG. 4, comprising

DESCRIPTION OF THE PREFERRED EMBODIMENTS

Figure 1:
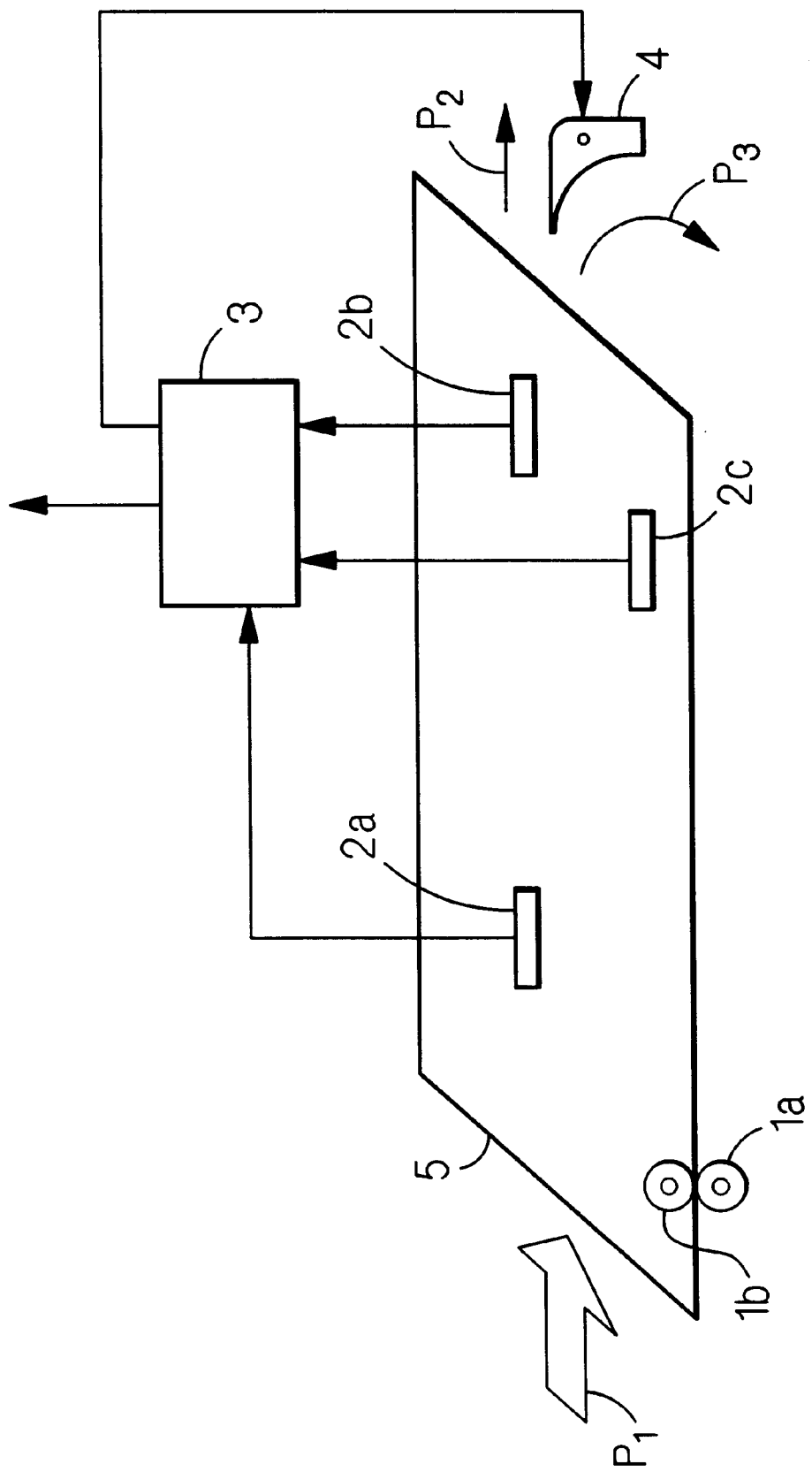
FIG. 1 shows schematically the structure of a banknote validator with which the present invention is suitable for use.

Referring to FIG. 1, a banknote validator according to one embodiment of the invention comprises a drive system comprising, for example, a plurality of pairs of rollers (for clarity, only one pair of rollers 1a, 1b is shown here) for moving a banknote 5 to be validated along a path P1 beneath a plurality of sensors 2a, 2b, 2c. In this embodiment, the sensors 2a–2c are optical colour measurement heads each arranged to detect optical amplitude at selected, different wavelengths, substantially as described in GB 1470737 and/or DE 2924605. The measurement heads 2a–2c are positioned in different lateral positions across the banknote 5. As the banknote 5 is moved past the measurement heads 2a–2c by the drive system 1, the output signals, for each sensed optical wavelength from the measurement heads 2a–2c are supplied in a continual sequence of samples, to a decision circuit 3 comprising, in this embodiment, a microcomputer (for example, one of the Motorola 68000 series of microcomputers) comprising an input circuit, a processing unit, and memory for storage of programme and constant data and for temporary storage of processing results and sensor output data.

Controlled by the decision circuit 3 is an accept/reject gate 4 moveable between a first position, in which the banknote 5 passes on an accept path P2 (to, for example, a cash box) and a reject path P3 on which the note passes to, for example, an outlet slot for returning the note.

Thus far, the above described apparatus corresponds to known money validators such as, for example, the BSN 385 money validator available from Mars Electronics International Inc., (Sodeco Cash Management Systems Division), Geneva Branch, Chemin Pont-du-Centenaire 109, CH-1228 Plan-Les-Ouates, Switzerland, and other constructional details of the drive system 1, the optical measurement heads 2, the decision circuit 3 and the accept/reject gate 4 may be as in that apparatus.

Figure 2:
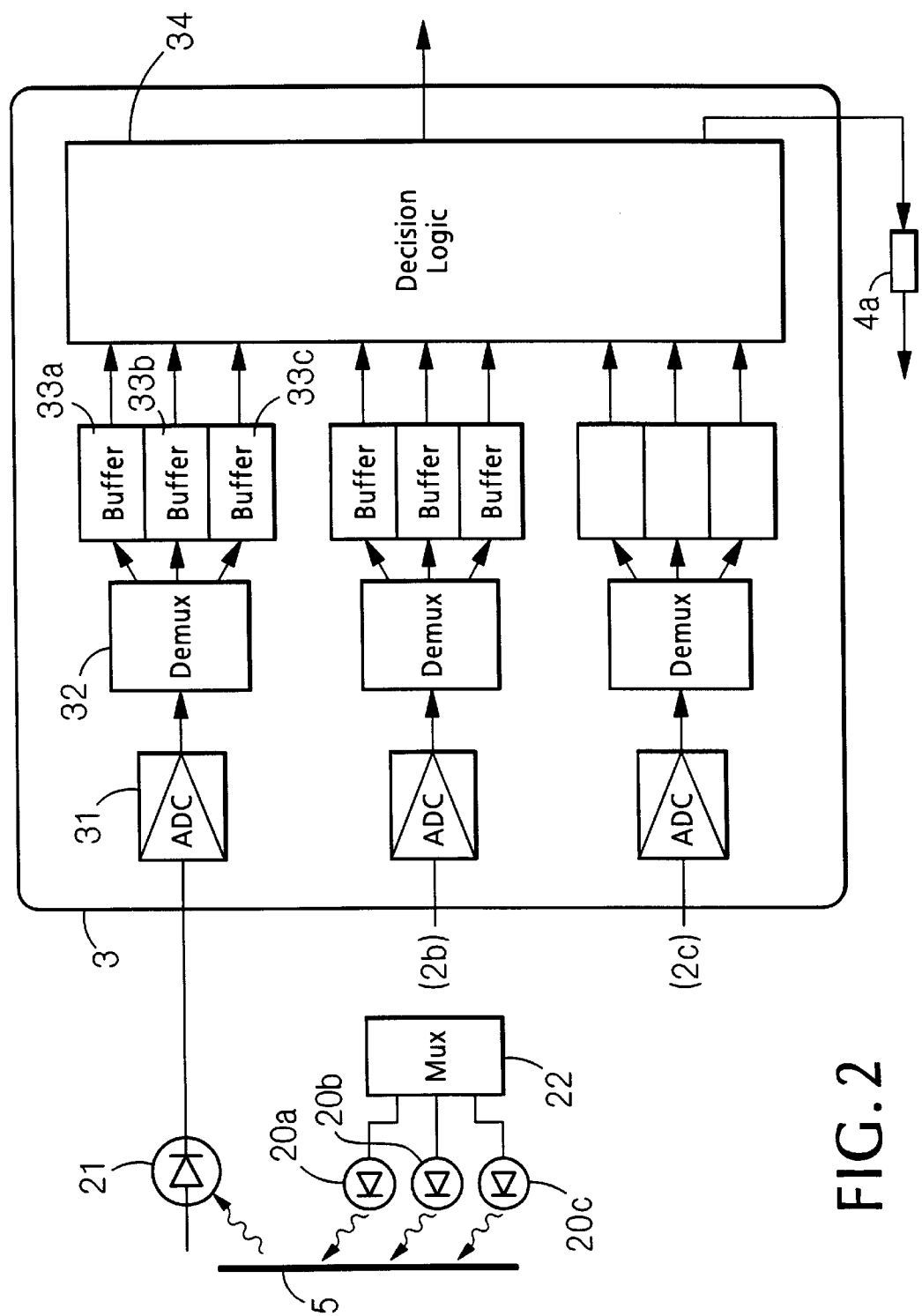
FIG. 2 is a block diagram showing schematically the electrical components of a validator according to FIG. 1.

Referring to FIG. 2, each of the measurement heads 2a, 2b, 2c comprises a plurality of light sources (e.g. LEDs) 20a, 20b, 20c each generating a different optical wavelength (the term "optical" is not limited to wavelengths visible to the human eye). The sources 20a–20c are energised in sequence by a multiplexer 22 to illuminate the banknote 5, and the diffuse reflection from the banknote 5 is received by a sensor 21 which generates a corresponding output signal indicative of the diffuse reflected intensity. The output of the sensor 21 is sampled in sequence with the multiplexer 22, to provide a train of analogue signal samples which are output to the decision circuit 3. Within the decision circuit 3, the output of the sensor 21 is received at an analogue to digital converter 31, which outputs a corresponding train of digital signal samples to a demultiplexer 32, which demultiplexes the samples and supplies the three demultiplexed sensor outputs to corresponding buffers 33a–33c.

The buffers 33a–33c may, for example be contiguous portions of a single read/write memory. Each buffer 33a–33c therefore contains a time sequence of output values, corresponding to the diffuse reflected intensity from a respective one of the optical wavelengths of the LEDs 20a–20c, as the banknote 5 is moved past the sensor head 2a. For example, each buffer may contain thirty signal values corresponding to a scan of the length of a given banknote type.

The thirty outputs of each buffer (a total of 270 outputs) are supplied to the decision logic 34, which supplies a banknote identification signal identifying which of a plurality of possible valid banknotes has been recognised for utilisation by the apparatus to which the validator is connected (for example, an automatic ticket dispensing machine) and a true/false drive signal for driving a gate solenoid 4a forming part of the gate 4, to select between the accept and reject positions of the gate 4.

Figure 3:
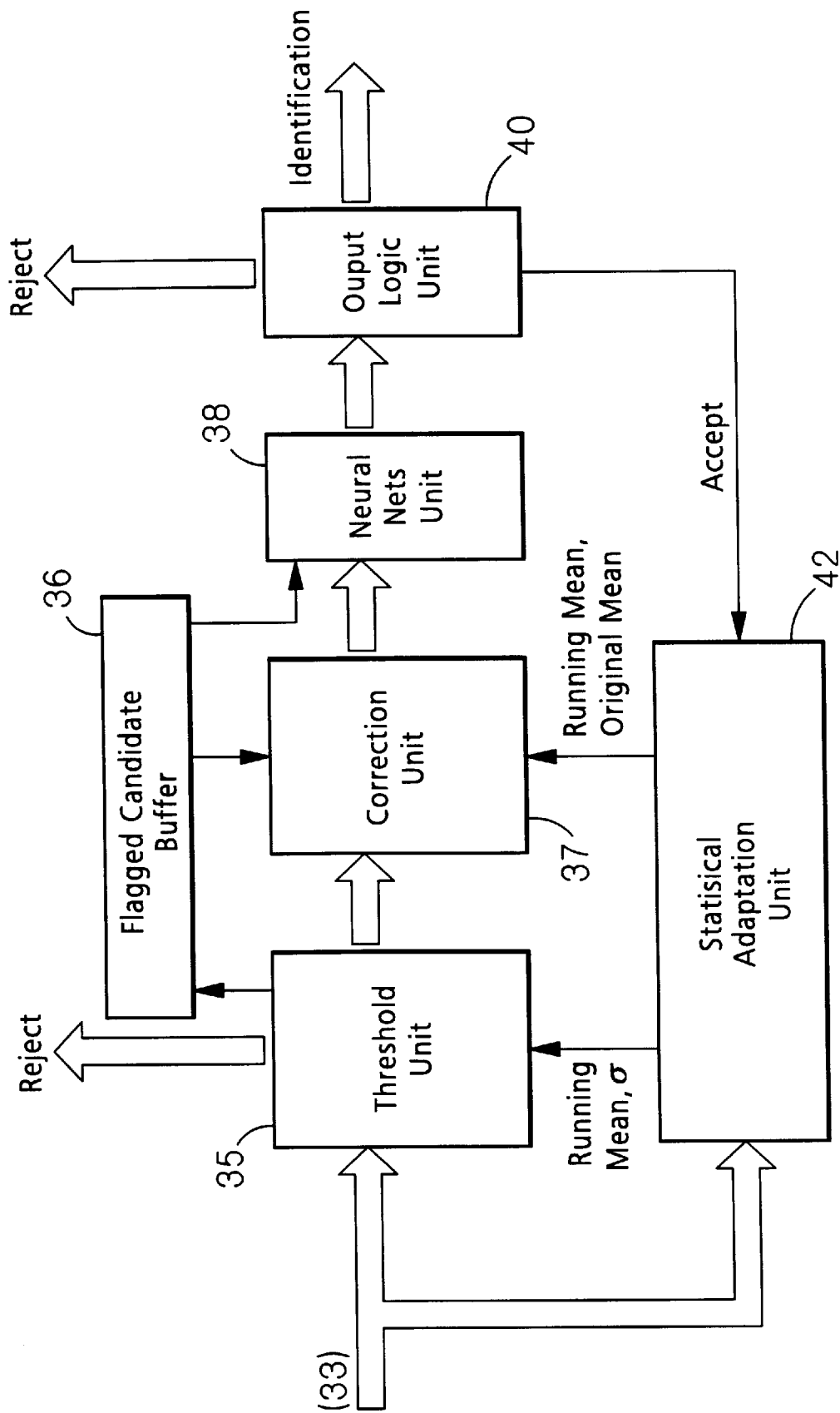
FIG. 3 is a block diagram showing the functional elements of a validator according to an embodiment of the present invention.

Referring to FIG. 3, the functional elements provided by the decision circuit 3 comprise a thresholding unit 35, a flagged candidate buffer 36, a measurement correcting unit 37, a neural network classifier unit 38, an output logic unit 40, and a statistical adaptation unit 42.

In use, as described in greater detail below, the threshold unit 35 receives the measurements from the buffers 33 and subjects them to a relatively coarse test which rejects articles which differ greatly from any acceptable banknote. Each time the measurements do fall within the thresholds associated with a particular type of acceptable banknote in a particular type of orientation, a candidate entry flag is stored in the flagged candidate buffer 34 indicating the corresponding type of banknote and orientation thereof.

Next, for each flagged candidate type in the flagged candidate buffer 36, a statistical correction is applied to the measurements from the buffers 33, to account for measurement and population drift, using data stored in the statistical adaptation unit 42, a separate correction being applied for each candidate in the buffer 36 corresponding to the drift for that candidate type.

Then, the corrected measurements are applied to a neural network classifier unit 38 in turn. The outputs of the neural network classifier 38 comprise one or more recognition signals relating to each type of banknote to be recognised.

The output recognition signals from the neural network unit 38 are combined by the output logic unit 40 to provide a signal identifying a particular type of recognised banknote, or a signal rejecting the banknote and actuating the gate 4.

In the event that a particular type of banknote is recognised, the statistics held in the statistical adaptation unit 42 are updated to reflect the measurements held in the buffer 33 for the just accepted banknote.

Referring to FIG. 4, the operation of the decision circuit 3 will not be discussed in greater detail.

Threshold Unit 35

Figure 4A:
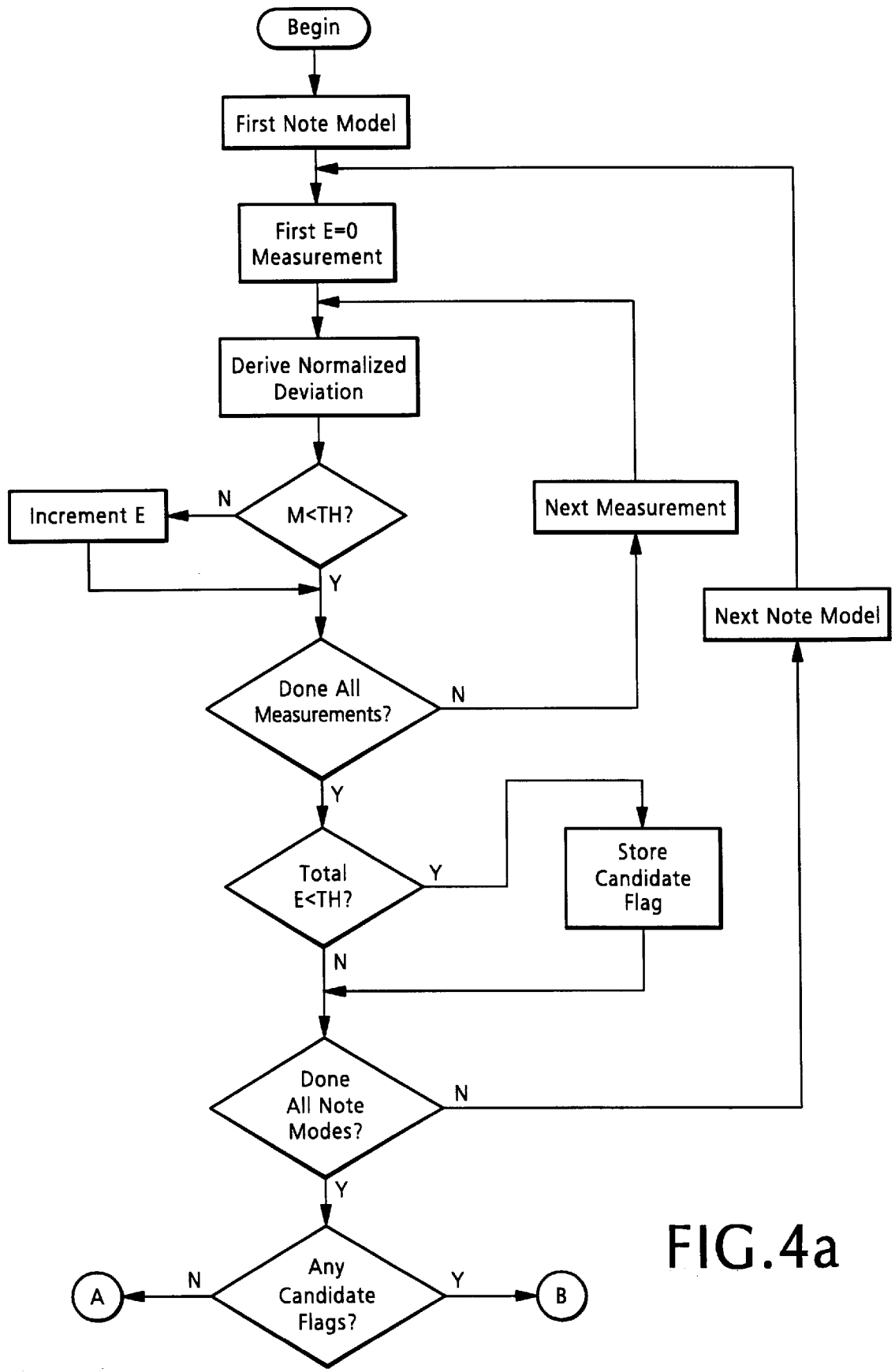
FIGS. 4a–4d, is a flow diagram showing schematically the operation of a validator according to the embodiment of FIG. 3.

FIG. 4a indicates the operation of the decision circuit 3 in providing the threshold circuit 35. The threshold circuit 35 makes use of statistical data held in the statistical adaptation circuit 42. The statistical adaptation unit holds, for each note to be recognised (for example eighteen notes), in each orientation (typically, four orientations) a means and a standard deviation value $\overline{m}_{l,n}$; $\sigma_{l,n}$; where 1 is the index of the banknote and orientation type (l=1 to L (e.g. 72)) and n is the index of the measurement (n=1 to N, where N is the total number of measurements (e.g. 270)).

For each measurement, the error between the measurement and the corresponding value stored for a given candidate is calculated as follows:

$$\frac{(m_n - \overline{m}_{l,n})}{\sigma_{l,n}}$$

If this error is greater than a predetermined threshold Q, an error score E (initialised at zero) is incremented; if it is equal to or less than the threshold the error score E is not incremented. The threshold Q may conveniently be the same for all measurements, for a given candidate note/orientation. Typically, the threshold Q is set at around 4 (corresponding to 4 standard deviations) for the measurement concerned.

Thus, when all measurements have been thresholded, the incremented total E corresponds to the number of occasions on which individual measurements have exceeded the respective threshold for the candidate. This total E is then compared with a threshold $T_l$, and if the error does not exceed the threshold then a flag corresponding to the candidate is stored in the flagged candidate buffer 36. If the threshold $T_l$ is exceeded, then the candidate is not stored in the flagged candidate buffer. The threshold T for each candidate is selected to be relatively wide, so that substantially all valid banknotes of the type and orientation concerned will be accepted, regardless of whether some confusably similar banknotes or forgeries would also be accepted.

The process is repeated for each of the L candidates. After this, if there are no flagged candidates in the flagged candidate buffer 36, the banknote is not even remotely similar to any of the acceptable denominations, and the control unit 3 actuates the reject gate 4 to reject the banknote, as shown in FIG. 4c.

Values for Q and T for the various denomination/orientations are stored in memory provided in the threshold unit 35.

Correction Unit 37

Figure 4B:
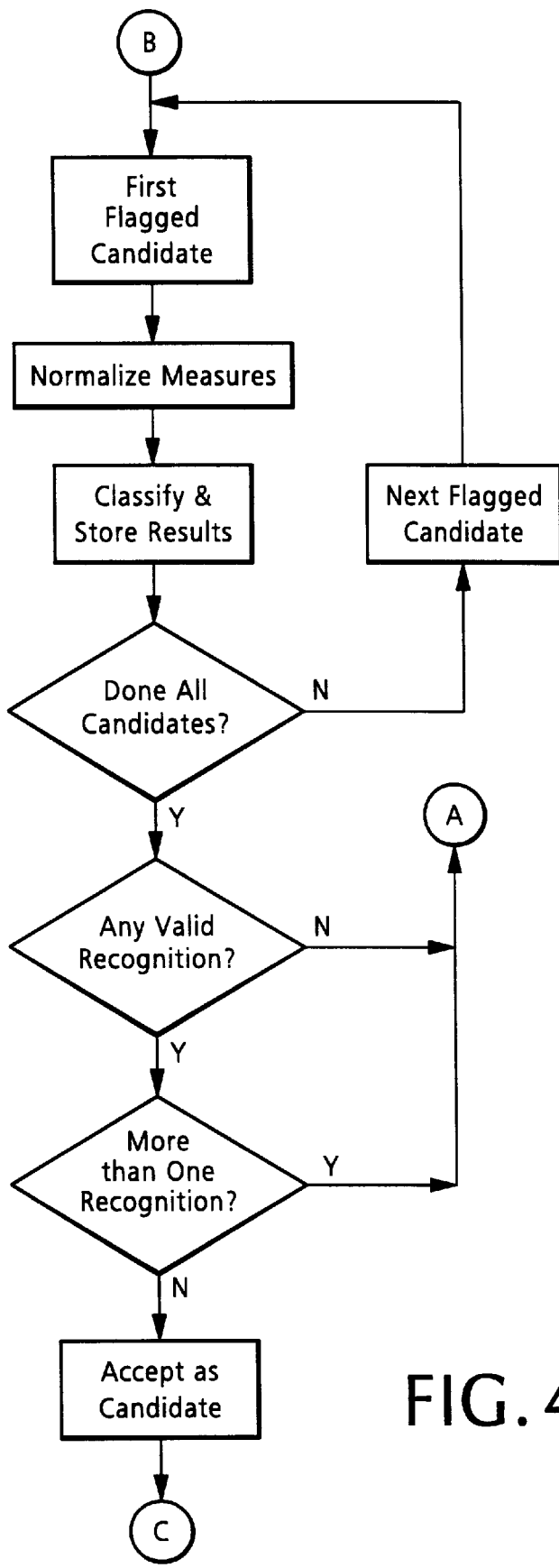
Figure 4C:
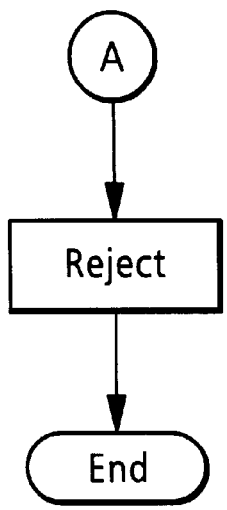
Figure 4D:
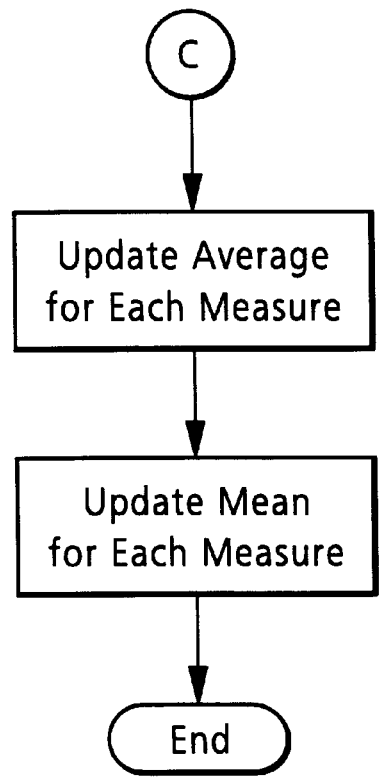

Referring to FIG. 4b, when functioning as the correction unit 36 the decision circuit 3 is arranged, for each of the candidate note/orientations indicated by the contents of the flagged candidate buffer 34, to read the measurement values from the buffer 33 and to correct each for the effects of drift by dividing by the running average $(\overline{m}_{l,n})$ relevant to that candidate 1 supplied by the statistical adaption unit 42.

The magnitude of the measurements are aligned with those for which the neural network unit 38 was trained by multiplying each measurement by the mean value $(m_{l,n})$, of the measurement in question, which was encountered in the banknotes used to train the neural network unit 38 for that candidate 1. Thus, for each measurement, a corrected measurement $m'_n$ is calculated as follows:

$$m'_n = \left(\frac{m_{l,n}}{\overline{m}_{l,n}}\right) m_n$$

Neural Network Unit 38

Figure 5:
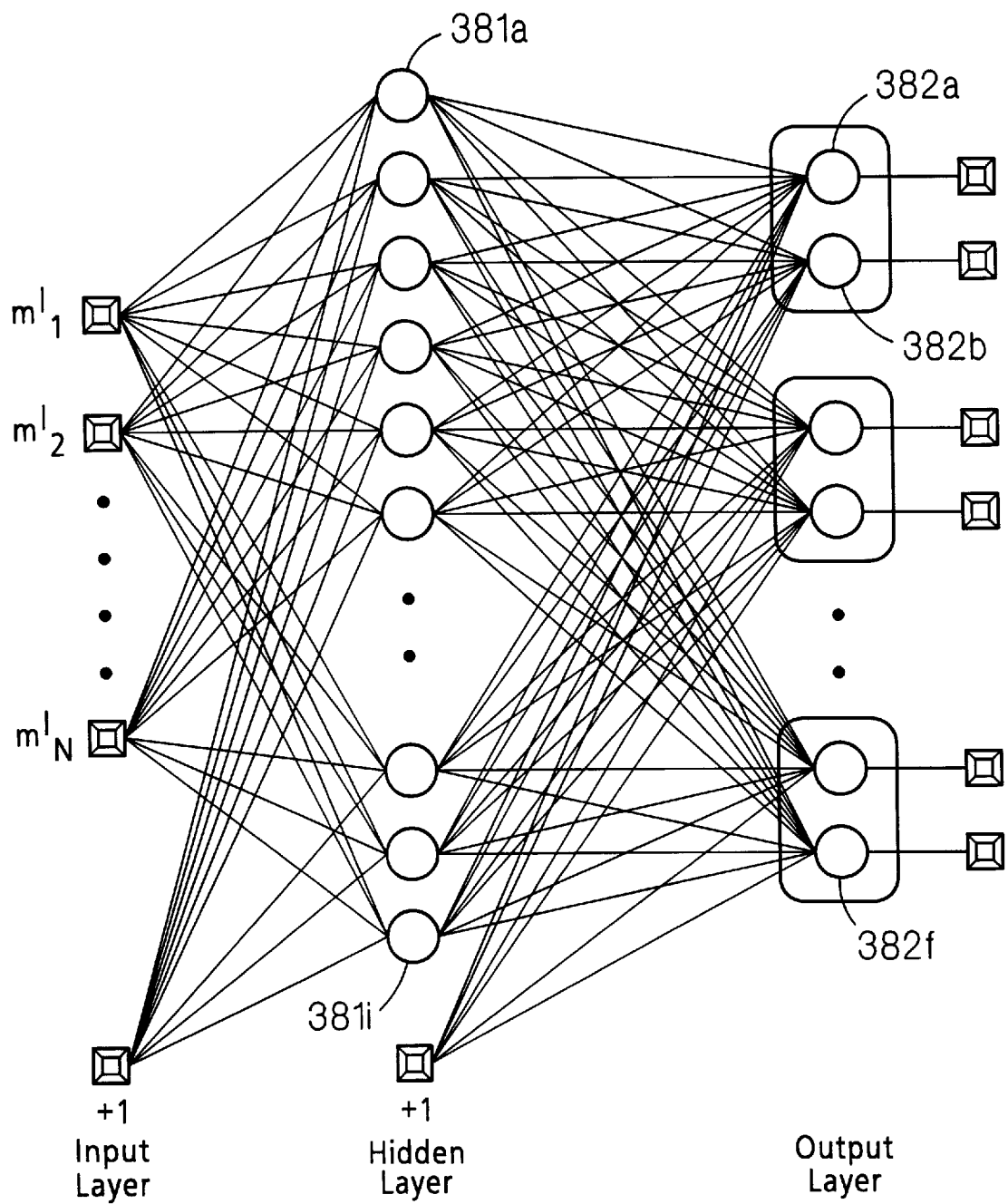
FIG. 5 is a block diagram illustratively showing the operations performed by a neural network unit forming part of the embodiment of FIG. 3.

Referring to FIG. 5, the schematic structure of the neural network unit 38 is illustrated. The corrected measurements $m'_1 - m'_n$ are each supplied to each of a plurality of hidden layer nodes 381a–381i (in this embodiment, twelve such hidden layer nodes 381 are employed), and the outputs of each of the hidden layer nodes 381a–381i are each supplied to each of two L output layer nodes (two output layer nodes for each note to be recognised in each orientation). Output layer nodes 382a–382f are illustrated here.

For each of the L note/orientation combinations, a first output layer node (for example 382a) generates an output signal the value of which indicates whether the tested note is recognised as corresponding to that candidate or not, and a second output layer node (for example 382b) generates an output signal indicating whether the tested note corresponds to a known forgery for that type of candidate or not.

The weights W of the output nodes are generated in the training phase such that the outputs of the output nodes 382 are saturated (i.e. either high or low).

In this embodiment, the neural network unit 38 provides a multilayer perceptron or back propagation type network (known of itself), in which the output Y of each node is given by:

$$y_i = S\left(\sum_{j=1}^{K} W_{ij} X_j\right)$$

where X represents the vector of inputs to the node, and $W_{ij}$ is a corresponding vector of predetermined weighting coefficients derived during the training phase and stored by the neural network unit 38. As shown in FIG. 5, one of the inputs to each node maybe a constant (e.g. H as shown); the other inputs are, in the case of the hidden layer nodes 381a, the vector of measurements $m'_1 - m'_n$ and, in the case of the output layer nodes 382, the vector of outputs of the hidden layer nodes 381.

Figure 6:
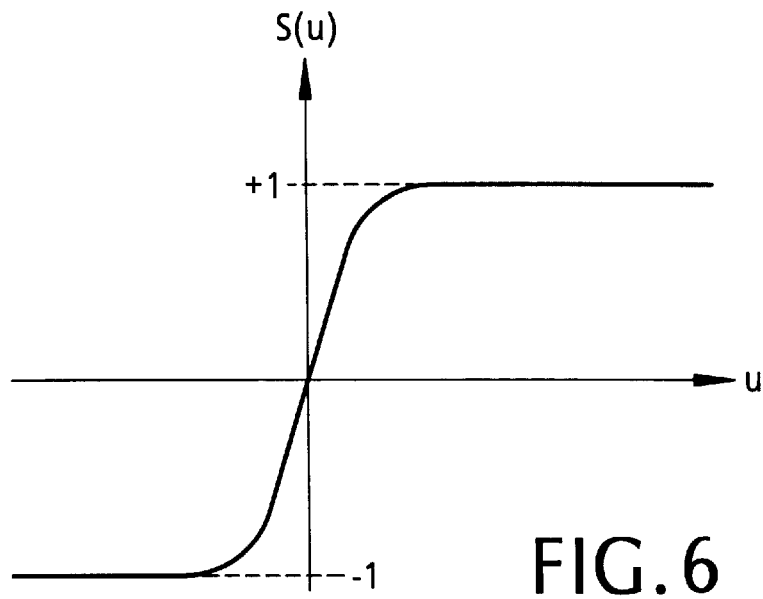
FIG. 6 shows the activation function performed by nodes of the neural network of FIG. 5.

The function S is a non-linear function which acts to compress the range of the node output signal; preferably it has a generally sigmoidal shape as illustrated in FIG. 6. In this embodiment, it is given by a hyperbolic tangent:

$$S(u) = \frac{(e^u - e^{-u})}{(e^u + e^{-u})}$$

In this embodiment, the neural network unit 38 may store multiple neural networks of the type shown in FIG. 5; one neural network being provided for the note set of each country in which the validator might be used, and the neural network unit being operable to selectively employ only one of the neural networks.

It will readily be seen that the hidden layer nodes 381 and output layer nodes 382 need not be provided by separate processors but could be (and in this embodiment are) provided by a microcomputer circuit arranged to calculate and store the output of each hidden layer node in turn, and then use these to calculate the output of each output layer in turn, in accordance with the above relationships.

The weight values W for each node 381a–381c, 382a–382f of the hidden layer and the output layer are accordingly stored in memory provided within the neural network unit 38, and thus effectively characterise the network.

Operation of the Neural Network Unit 38

Referring to FIG. 4b, for each candidate l in the flagged candidate buffer 36, the correction unit 37 reads the running average ($\overline{m}_{l,n}$) and the average of the training data $m_{l,n}$ for each measurement value held in the buffer 33, and calculates corrected measurements $m'_n$ as discussed above. These corrected measurements are then employed as inputs to the neural network unit 38, which calculates output values for each of the two L outputs nodes 382a–382f. The output values are then temporarily retained. Next, the correction unit proceeds to the next candidate in the flagged candidate buffer 36, reads the running average and training data averages from the statistical adaptation unit, reads once more the measurements from the buffer 33, and calculates a new set of corrected measurements, corrected for the drift which would be encountered for that candidate. This corrected set of measurements $m'_n$ are then presented to the neural network unit 38 which once more calculates the outputs of the output layer nodes 382a–382f, and once more buffers these.

This process is then repeated for each of the candidates in the flagged candidate buffer 36.

Output Logic Unit 40

The output logic unit 40 receives the 2L outputs of the neural network unit 38 for each of the candidates in the flagged candidate buffer. On the basis of these output node outputs, the output logic unit 40 generates either a recognition output indicating recognition of one of the valid banknotes, or a signal indicating that no valid banknote has been recognised (to operate the reject gate 4).

For each of the possible candidates in the flagged candidate buffer 36, the outputs of the output nodes 382 may be in one of several conditions:

1. The "true" output node for the candidate being considered may be the only output node which is generating a positive output signal.

2. A different output node may be generating a positive output signal.

3. Several output nodes may be generating a positive output signal.

4. One of the "false" output nodes may be generating a positive output signal, indicating recognition of a forgery.

5. No output node may be generating a high output signal (in which case, the document is completely unknown to a neural network 38).

In all cases other than the first of the above, the output logic unit 40 generates a signal to reject the tested note. Thus, a note is rejected even if there is confusion as to its identity (indicated by several outputs being high) or its identity is false (indicated by a high output other than at the output node which corresponds to the candidate in question for which the input measurements were corrected).

Furthermore, the note is also rejected if confusion has arisen because a single (apparently correct) high output signal has been generated for more than one of the candidates in the flagged candidate buffer 36; that is to say when correcting the data for a first flagged candidate gives rise to an apparently correct result but so does correcting the data for a second flagged candidate.

In the case where there is no confusion, either between different output nodes for the same corrected input data or for network outputs for differently corrected data, the single correct output node output signal identifies the note value and orientation, which are output by the output logic unit for use by the automatic machinery with which the validator is to be used.

Effect of the Threshold Unit 35

Figure 7:
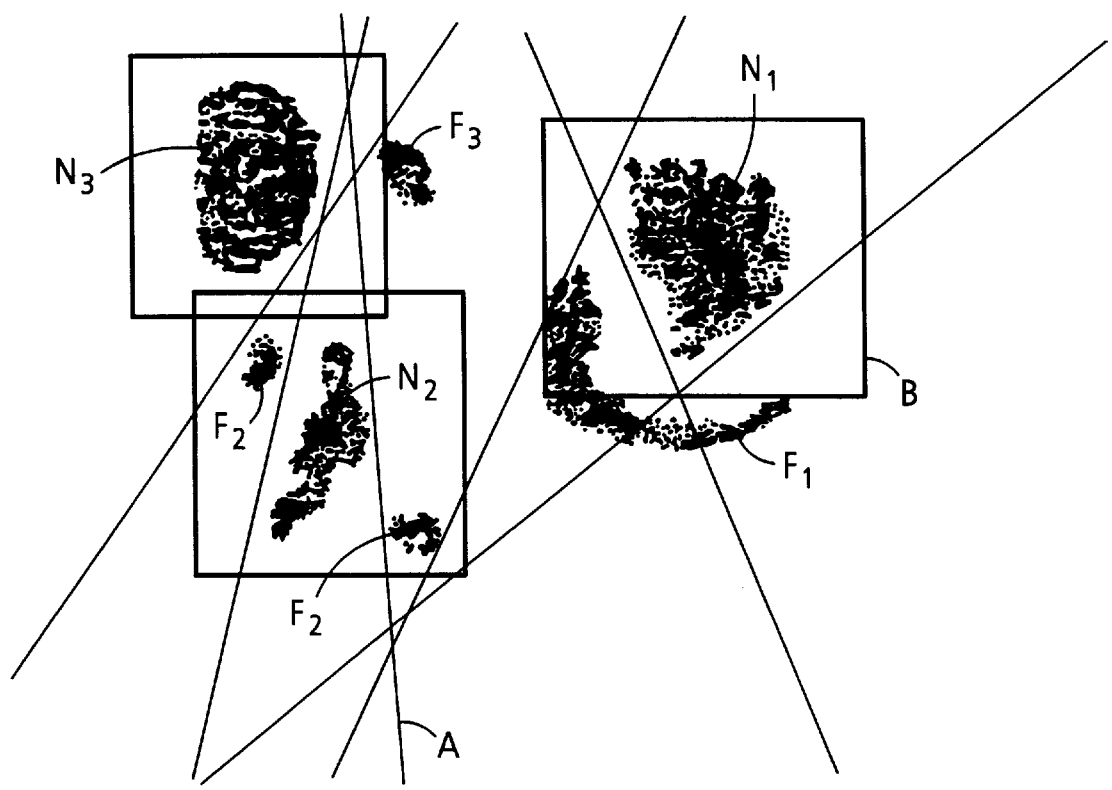
FIG. 7 is a diagram illustrating, in an exemplary two dimensional pattern space, the operation of the embodiment of FIG. 3.

Referring to FIG. 7, in a two dimensional illustration of a measurement space, the measurement values for genuine notes of a first denomination are clustered in a group N1; those for a second denomination in a group N2 and those for a third denomination in a group N3. A forgery of notes of the first type is shown clustered as F1; two forgeries for a note of the second type are shown as clusters F2; and a forgery for a note of the third type is shown as a cluster F3.

The boundaries corresponding to the transition between different output nodes 382a–382f are shown as thin lines A. It will be seen that the neural network unit 38 has found lines or surfaces which can effectively discriminate between each genuine note and the known forgeries. However, these separation planes leave a large volume of space (for example the space above the cluster N1 or that to the left of the cluster N3) unpartitioned, because no forgeries having measurements corresponding to these regions were present in the data on which the neural network was trained. Accordingly, although the neural network unit 38 is accurate in discriminating between different types of genuine note, and between genuine notes and known forgeries, it gives a poor, or at best, an unknown performance against new types of forgeries having measurements falling in such volumes of space.

Referring once more to FIG. 7, however, the threshold unit 35 acts to apply a relatively wide acceptance threshold around each genuine banknote cluster N1, N2, N3, and thus effectively limits the volume in the measurement space within which test articles will be accepted as corresponding to each of those banknote classes. Accordingly, although the threshold unit 35 is completely ineffective in discriminating between the banknotes N1 and N2 and their known forgeries F1 and F2, it offers a considerable measure of protection of the validator against unknown forgeries whereas the neural network unit 38 provides a much more accurate discrimination against known forgeries.

Statistical Adaptation Unit 42

Figure 8:
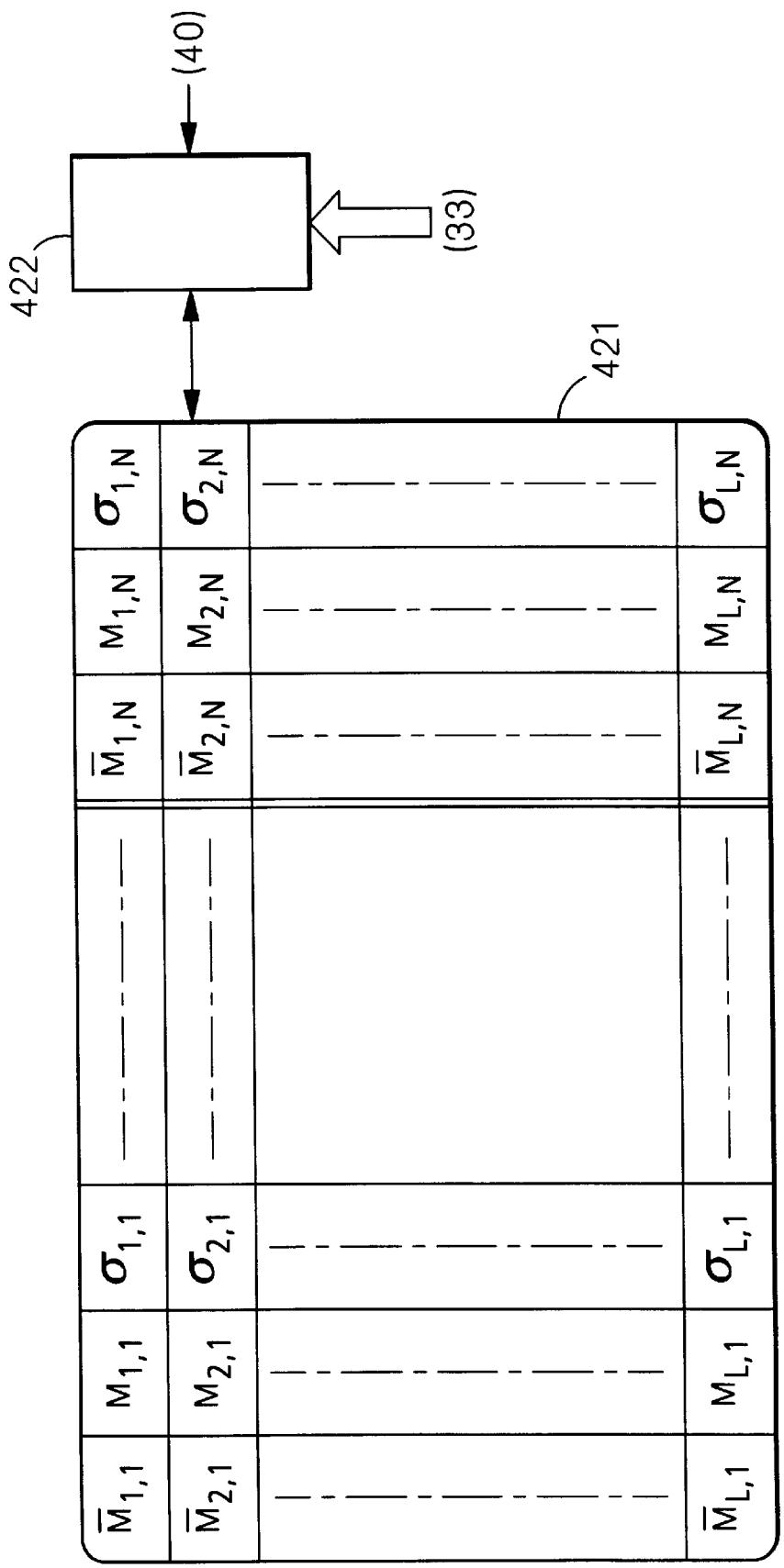
FIG. 8 is a block diagram showing in greater detail the structure of a statistical adaption unit forming part of the embodiment of FIG. 3.

Referring to FIG. 8, the statistical adaptation unit 42 comprises a read/write store 421 (e.g. an area of RAM) and an arithmetic processing unit 422 arranged to read and write to the store 421, and to perform predetermined statistical processing on the contents thereof.

As shown in FIG. 8, the store 421 stores N×L records (where N is the number of measurements and L is the number of denominations/orientation candidate notes). Each record comprises three numerical values; a running average $(\overline{m}_{l,n})$ a running deviation $\sigma_{l,n}$, and a training set mean $m_{l,n}$. The last of these is a constant, the value of which is not altered by the processor 422.

When the output logic unit 40 indicates, as described above, that a valid note of a particular denomination in a particular orientation has been recognised, the candidate number l of the note is supplied to the statistical processor 422. The statistical processor 422 then reads each of the N running average and deviation values in the table 421 relevant to that candidate l and calculates an updated average and deviation value utilising the existing value and the corresponding measurement value read from the buffer 33. The updated value is then stored in the store 421 for subsequent use.

In this embodiment, the running average $(\overline{m}_{l,n})$ is a running mean, and the deviation $\sigma_{l,n}$ is the standard deviation. Accordingly, in this embodiment, the statistical processor 422 is arranged to calculate the new mean value as $$\overline{m}^1 = \frac{P_1 \overline{m} + m}{P_1 + 1}$$

and the standard deviation is $$\sigma^1 = \frac{P_2 \cdot \sigma_1 + \sqrt{\frac{\pi}{2}} \cdot |m - \overline{m}_k|}{P_2 + 1}$$

The values of the parameters $P_1$ $P_2$ determine the influence of each new measurement on the running average and deviation, and are therefore relatively large in practice. The values $P_1$ $P_2$ may, in another embodiment, be functions of the number of times the stored values have been adjusted; in this case, for each candidate a count is incremented each time an adjustment is made to the mean and deviation values for that candidate and the $P_1$ $P_2$ values are determined in accordance on the count (for example by a linear relationship $P_i = A_i + B_i \cdot \text{count}$).

Thus, each time a banknote is accepted, the average (and in this embodiment, the deviation) of the measurements found for the recognised class of banknote are updated to take account of drift of the characteristics of the banknote or the validator.

Training the Neural Network 38

Although it is not necessary for an appreciation of the operation of the invention, a brief description of the method of training the neural network unit 38 so as to derive suitable values for the weighting coefficients W, will now be disclosed. Specific details of the method in so far as it applies to back propagation MLP networks as described in the above embodiments, are well known to the skilled person and are described, for example in:

Rumelhart D E, Hinton G E and Williams R J: 'Learning internal representation by error propagation', in 'Parallel Distributed Processing: Explorations in the Microstructures of Cognition', eds Rumelhart and McClelland, 1, Foundations, pp 318–362, MIT Press (1986) (incorporated herein by reference), or in "Introduction aux réseaux de neurones"

F. Blayo

Cours du département dinformatique, laboratoire de microinformatique EPFL.

pp. 52–58

Lausanne, 25 mars 1991, or

"Une procédure dapprentissage pour réseau à seuil asymétrique"

Y. Le Cun

Actes de COGNITIVA 85, pp. 522–604

Paris, juin 1985, or (in general terms) in

"Adaptive Switching Circuits"

B. Window, M. E. Hoff 1960 IRE WESCON Convention Record, New York: IRE, pp. 96–104, 1960.

A measurement system similar to (but not necessarily implemented by) the measurement heads 2a, 2b, 2c measures the sensor values from a plurality of banknotes comprising a training set. The training set comprises subsets of each banknote in each orientation, and of all known forgeries (if any) for each note/orientation.

Figure 9:
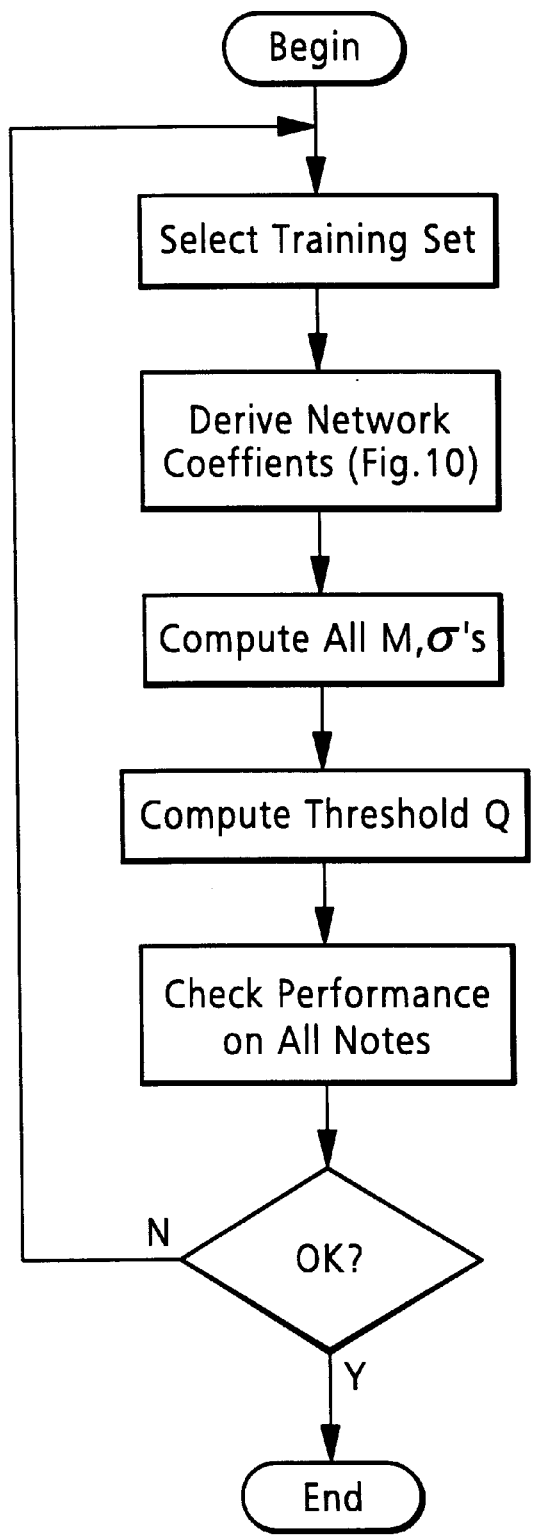
FIG. 9 is a flow diagram showing one method of deriving the coefficients employed in the embodiment of FIG. 3.

Referring to FIG. 9, each subset of the training set is randomly selected to comprise, for example, 10% of a larger available population of banknotes.

Figure 10:
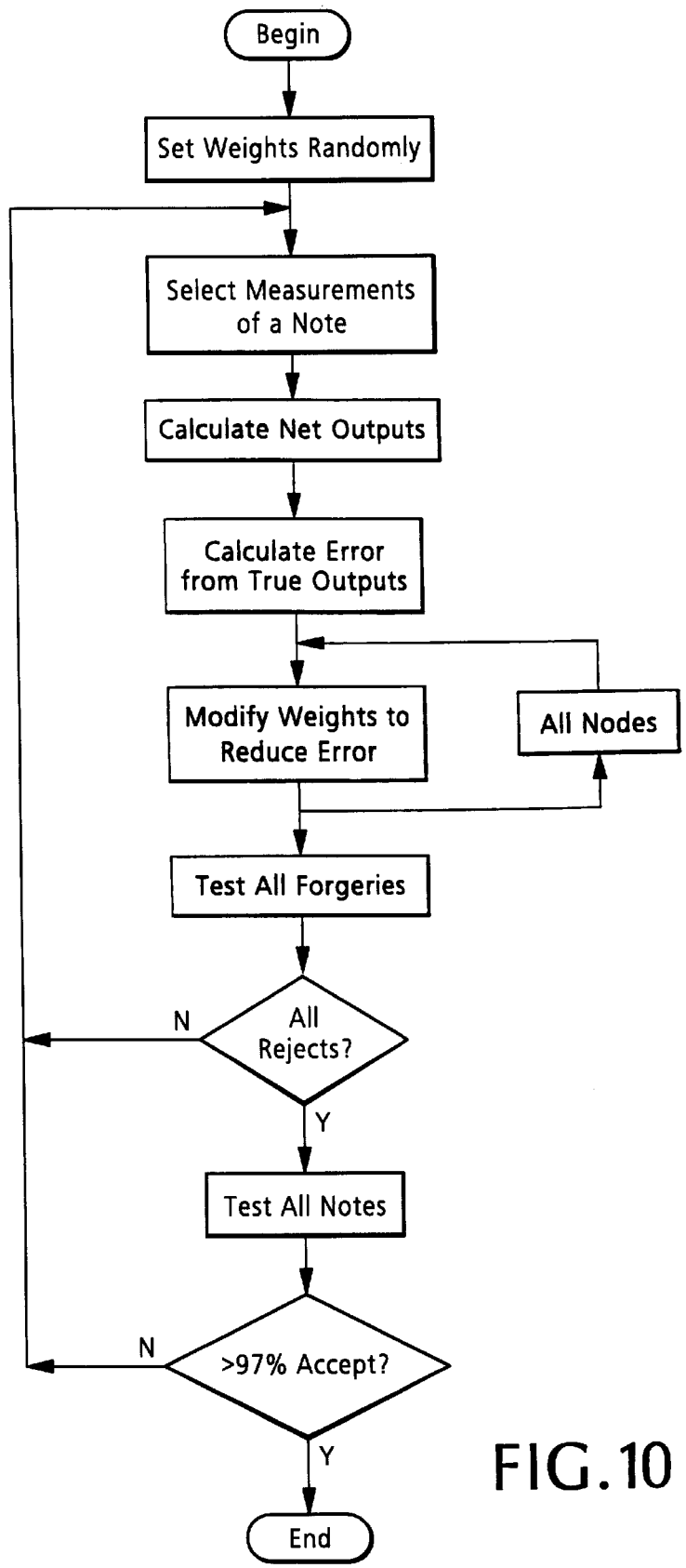
FIG. 10 is a flow diagram forming part of FIG. 9 and showing illustratively one way of deriving the data characterising a neural network unit of the kind illustrated in FIG. 5.

Next, the neural network is trained as shown in FIG. 10 (i.e. the values of the weighting constants are derived) by initially selecting a random set of weighting constant values; then calculating, using these weighting constant values, what the outputs of the hidden layer 381a–381i and output neurons 382a–382f would be; then comparing these outputs with the "correct" outputs for the first node (i.e. +1 for the output node 382a382f corresponding to the identity of the note, and −1 for all other output nodes); and then adjusting the weights of each output layer node and hidden layer node using the back propagation method to incrementally shift the calculated outputs corresponding to the output layer nodes towards the "true" values.

This is then repeated for each node of the training set, in random order, and the process is iterated until the outputs calculated to correspond to the output layer nodes give a very high rejection rate (i.e. closely approximating 100%) for forgeries, and a high acceptance rate (i.e. above 97%) for all genuine banknote denominations/orientations.

If the weighting values give rise to output node output values which meet these criteria, the weighting values are considered to have successfully characterised the neural network (i.e. the neural network has been trained successfully), and the weighting values are stored.

Returning to FIG. 9, the next step is to use all the measurement values for all the notes of each subset to calculate the training data mean and the initial value of the standard deviation, to be stored in the table 421. The value of the running means is, at this stage, set to the same value as the training set means.

Next, the thresholds Q utilised by the threshold unit 35 are set for example at 4σ, in other words 4 times the standard deviation for each measurement derived from the training data.

The error score total T is then calculated so as to obtain 100% acceptance of all the banknote denominations/orientations in the set.

Finally, the performance of the validator is emulated using the neural network weighting coefficients; the thresholds Q; means, standard deviations and global error T calculated as above, and if all correct notes are accepted and all forgeries are rejected, the values thus calculated are taken to be sufficiently accurate. If this test is not met, another training set of notes is selected in the process of FIG. 9 is begun again.

When an accepted set of weight coefficients W thresholds Q and so on have been found, they are stored in the store 41, the threshold unit 35 and the neural network unit 38 of an unprogrammed validator which is otherwise as described above, and which is then ready for use.

It will be clear that the above described process may be performed on computing apparatus of any suitable kind arranged to receive measurement signals or previously stored data corresponding to measurement signals, from banknotes. As a validator itself comprises a measurement unit together with, in some embodiments, a microprocessor, the validator may be programmed to perform the training process just described itself prior to use in validation, but the manner in which the data characterising the validator whilst validating is derived is not relevant to the operation of the validator whilst validating.

Other Embodiments

In a further embodiment, the structure of the neural network shown in FIG. 5 is simplified so that the true/false output nodes 382*b*, 382*d*, 382*f* are omitted and only a single output node for each denomination/orientation is present. This reduces the volume of calculation to be performed by the network.

Although in the above description the mean and standard deviation are discussed, it would equally be possible to employ different measures of the running average and variability of the data; for example by maintaining a tracking median and/or a measure based on the sum of differences from the running average. In some embodiments, it may be possible merely to adapt either the running average or the measure of variability, but not both.

Although in the above described embodiments, the threshold unit 35 applies a coarse test comprising applying a plurality of thresholds and then counting the number of deviations from the thresholds, other coarse acceptance tests are also possible; for instance, deriving a "city block" distance metric or a Mahalanobis distance metric. However, in some aspects it is preferred to utilise coarse tests which share with the above described embodiment the feature of accepting, in a large number of measurements, a small number of deviations from acceptable limits due to (for example) a small damaged area of a note.

In the foregoing, the "neural network" when used to validate will be understood to comprise apparatus which calculates, utilising predetermined weighting values, a number of outputs from input data as described above, whether or not such calculations are performed in parallel and regardless of whether they are performed by dedicated hardware or a general purpose calculating device suitably programmed. The weighting values, as described above, are found iteratively from training data.

In another embodiment, the validator itself is arranged to perform the above training operations, for example to allow learning of new banknote types in the field.

Although in the above described embodiments, each measurement is normalised prior to application to the neural network, it will be understood that the same effect could be achieved by temporarily normalising the coefficient values of the input nodes 381 of the neural network, and this is equally within the scope of the invention. Equally, through-out the foregoing description, the skilled reader will understand that (except at nonlinear stages of the process) the associative and distributive laws of arithmetic are applicable so that operations may be performed in other orders or manners than those described above, to achieve the same effect.

Although LED's have been mentioned, it will be clear that other types of optical emitter could be employed, operating in the visible or invisible spectra. Equally, magnetic or other sensors could be employed instead.

Further, other types of nonlinear function could easily be employed; for example; a Radial Basis function, or a sigmoid function $S(u)=1/(I+e^{-u})$.

Accordingly, many other modifications may be made to the preceding invention without departing from its scope and nature.

I claim:

1. A method of classifying a test article as one of a plurality of acceptable denominations of articles of currency, comprising:

deriving a plurality of measurement signals from a test article; and applying an acceptance process to said measurement signals, said acceptance process calculating first, second and third outputs indicating correspondence with first, second and third denominations, wherein for each said test item said acceptance process is performed a plurality of times, differently adjusted to compensate for the effects of measurement drift for at least said first, second and third denominations at each performance, and in that in each performance of said acceptance process, an output corresponding to the denomination for which the acceptance process is adjusted is calculated, and at least two other outputs for two different denominations are also calculated.

2. A method according to claim 1 in which said acceptance process is performed said plurality of times in succession.

3. A method according to claim 1 in which said acceptance process is adjusted by processing said measurements using, for each denomination, stored drift data, to produce corrected measurements for each denomination, and applying a common acceptance process to said corrected measurements.

4. A method according to claim 1, further comprising applying an acceptance boundary test which limits the acceptance volume for each denomination so as to exclude forgeries not corresponding to training articles from which said process was derived.

5. A method according to claim 4, in which the acceptance boundary test comprises:

applying, for each acceptable denomination, relatively relaxed acceptance criteria so as to reject those denominations for which said relaxed acceptance criteria are not met prior to applying said acceptance process.

6. A method according to claim 1, in which the acceptance process comprises forming, for each acceptable denomination, a linear function of said measurement signals; and applying a continuous non-linear function to the result of said linear function.

7. A method according to claim 1, in which the acceptance process comprises a neural network process.

8. A method according to claim 7, in which the neural network process comprises a feed-forward process, the constants characterising the process having been iteratively derived in a training phase by back propagation.

9. A method according to claim 7, in which the neural network process comprises two network layers.

10. A method according to claim 9 in which the hidden layer of said neural network comprises substantially fewer nodes than the inputs thereto.

11. A money validator arranged to operate the method of claim 1.

12. A method according to claim 1, comprising employing optical sensing of the article of value.

13. A method according to claim 12, in which the optical sensing is performed at a plurality of different wavelengths.

14. A method of classifying a test article as one of a plurality of acceptable denominations of articles of currency, comprising:
   applying a classification process employing previously derived and stored reference data of valid or invalid training article examples of the denominations and arranged to distinguish therebetween, wherein level data relating to the range or average level of measurement values derived from the training articles is stored, for each of the denominations;
   processing the measurements derived from test articles using the stored level data to align them with each said stored range for each denomination during the classification process; and
   forming, for each denomination, a correction factor responsive to the ratio between said level data and a running average of said measurements.

15. A method according to claim 14, in which said level data is stored as an average value for each said denomination.

16. A method according to claim 14 further comprising applying an acceptance boundary test which limits the acceptance volume for each denomination so as to exclude forgeries not corresponding to training articles from which said process was derived.

17. A method according to claim 16 in which the acceptance boundary test comprises
   applying, for each acceptable denomination, relatively relaxed acceptance criteria so as to reject those denominations for which said relaxed acceptance criteria are not met prior to applying said acceptance process.

18. A method according to claim 14 in which the acceptance process comprises forming, for each acceptable denomination, a linear function of said measurement signals; and applying a continuous non-linear function to the result of said linear function.

19. A method according to claim 14, in which the acceptance process comprises a neural network process.

20. A method according to claim 19 in which the neural network process comprises a feed-forward process, the constants characterising the process having been iteratively derived in training phase by back propagation.

21. A method according to claim 19 in which the neural network process comprises two network layers.

22. A method according to claim 21 in which the hidden layer of said neural network comprises substantially fewer nodes than the inputs thereto.

23. A money validator arranged to operate the method of claim 14.

24. A method according to claim 14 comprising employing optical sensing of the banknote or article of value.

25. A method according to claim 24 in which the optical sensing is performed at a plurality of different wavelengths.

26. A money validator for classifying a test article as one of a plurality of acceptable denominations of articles of currency, comprising:
   sensor means for deriving a plurality of measurements from said test article;
   non-linear discriminant means for deriving a plurality of different linear combinations of said measurements and then applying, to each, a respective non-linear compression function (e.g. a sigmoid), to generate a plurality of non-linear output signals;
   decision means for rejecting a test article or accepting said test article as one of said plurality of denominations, based on said non-linear outputs; and
   adjustment means for applying a plurality of different adjustments, corresponding to said plurality of denominations, to said measurements to produce a plurality of sets of adjusted measurements, each of which is separately supplied to said means for producing a plurality of linear combinations.

27. A money validator for classifying a test article as one of a plurality of acceptable denominations of articles of currency, comprising:
   sensor means for deriving a plurality of measurements from the test article defining a point in measurement space;
   non-linear discriminant means for providing a plurality of discriminants which partition said measurement space into at least one acceptance region corresponding to at least one of said plurality of acceptable denominations, by deriving a plurality of different linear combinations of the measurements and then applying, to each, a respective non-linear compression function (e.g. a sigmoid), to generate a plurality of non-linear output signals;
   means for applying an additional acceptance boundary test which limits the volume of the acceptance region in said measurement space which would otherwise be applied by said validator; and
   decision means for rejecting a test article or accepting the test article as one of said plurality of denominations, based on the non-linear output signals in dependence on whether the point lies within the acceptance region.

28. A method for classifying a test article as one of a plurality of acceptable denominations of articles of currency, comprising:
   deriving a plurality of measurements from the test article defining a point in measurement space;
   providing a plurality of discriminants which partition said measurement space into at least one acceptance region corresponding to at least one of said plurality of acceptable denominations, by deriving a plurality of different linear combinations of the measurements and then applying, to each, a respective non-linear compression function (e.g. a sigmoid), to generate a plurality of non-linear output signals;
   applying an additional acceptance boundary test which limits the volume of the acceptance region in said measurement space which would otherwise be applied by said validator; and
   rejecting a test article or accepting the test article as one of said plurality of denominations, based on the non-linear output signals in dependence on whether the point lies within the acceptance region.

* * * * *